United States Patent [19]

Schindler

[11] 4,234,906
[45] Nov. 18, 1980

[54] PHOTOFLASH UNIT HAVING LIGHT-REFRACTIVE PRISMS

[75] Inventor: Donald R. Schindler, Burton, Ohio

[73] Assignee: General Electric Company, Schenectady, N.Y.

[21] Appl. No.: 921,430

[22] Filed: Jul. 3, 1978

Related U.S. Application Data

[63] Continuation-in-part of Ser. No. 800,193, May 25, 1977, abandoned.

[51] Int. Cl.³ ............................................. G03B 15/02
[52] U.S. Cl. ....................................... 362/16; 362/11; 362/17; 362/333; 362/339; 354/126
[58] Field of Search ................. 362/3, 11, 16, 17, 333, 362/339; 354/126

[56] References Cited

U.S. PATENT DOCUMENTS

| | | | |
|---|---|---|---|
| 2,082,100 | 6/1937 | Dorey et al. | 362/16 |
| 2,775,718 | 12/1956 | DuBilier | 362/16 |
| 2,811,907 | 11/1957 | Hyzer | 362/16 |
| 3,185,828 | 5/1965 | Ludloff | 362/16 |
| 3,488,486 | 1/1970 | Bretthauer | 362/16 |
| 3,609,332 | 9/1971 | Schindler | 362/16 |
| 3,858,038 | 12/1974 | Buzalski | 362/10 |
| 3,860,812 | 1/1975 | Schneider | 362/16 |
| 3,878,385 | 4/1975 | Kingston | 362/11 |
| 3,882,514 | 5/1975 | Graham | 362/11 |
| 3,935,442 | 1/1976 | Hanson | 362/11 |
| 3,980,877 | 9/1976 | Cote | 362/11 |
| 3,993,896 | 11/1976 | Wacker | 362/11 |
| 3,995,149 | 11/1976 | Lukas | 362/11 |
| 4,104,707 | 8/1978 | Schneider | 362/17 |
| 4,136,379 | 1/1979 | Chevali | 362/16 |

FOREIGN PATENT DOCUMENTS

952918 11/1956 Fed. Rep. of Germany ............ 362/16

Primary Examiner—Teddy S. Gron
Attorney, Agent, or Firm—Norman C. Fulmer; Lawrence R. Kempton

[57] ABSTRACT

A photoflash unit having one or more flash lamps, and a transparent cover in front of the flash lamps which is provided with elongated light-refractive prisms in front of each flash lamp so as to refract directly radiated light from the lamp when flashed in a more frontward direction and into the area to be illuminated. Prisms may be provided on both sides of the cover.

22 Claims, 4 Drawing Figures

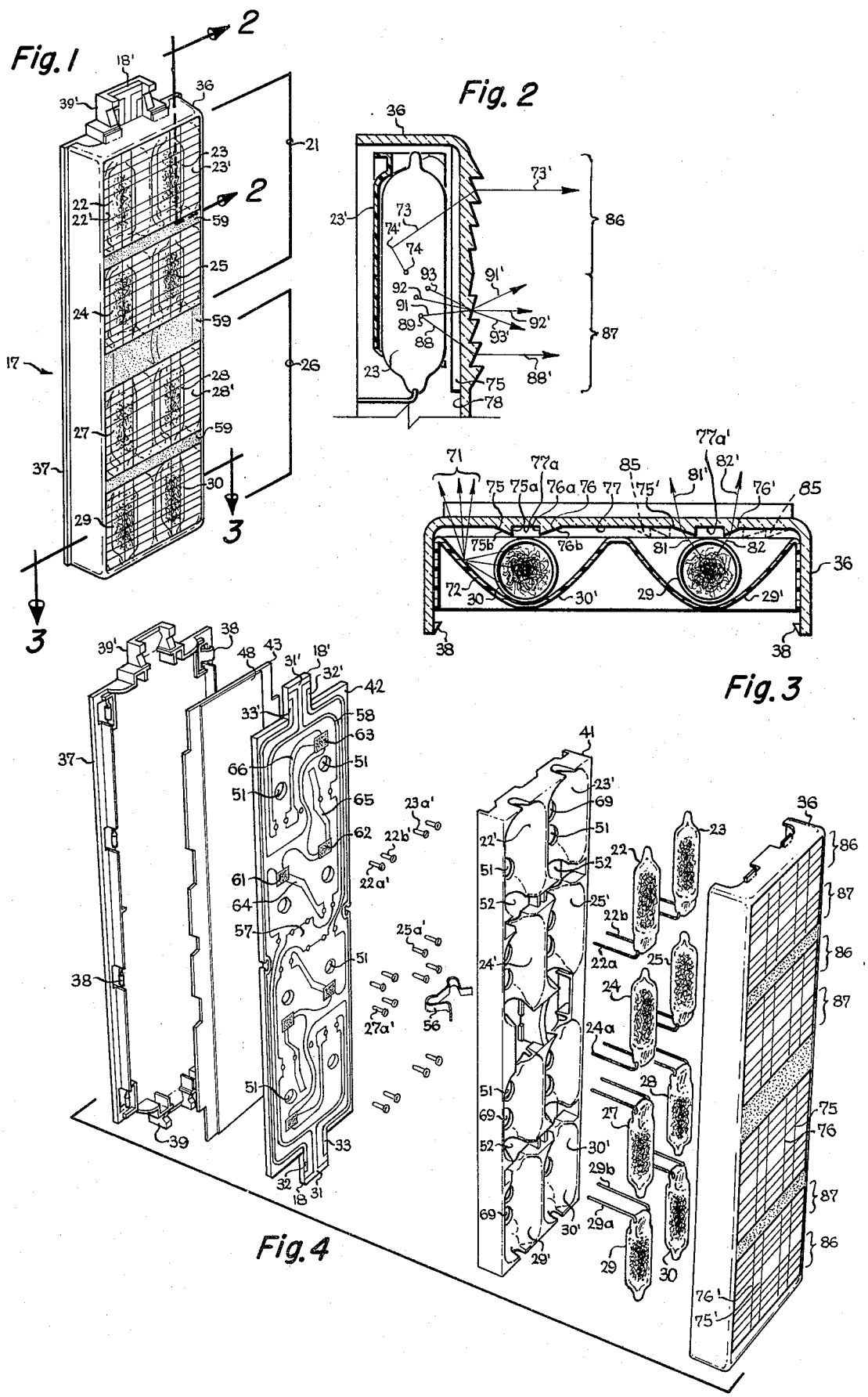

PHOTOFLASH UNIT HAVING LIGHT-REFRACTIVE PRISMS

This is a continuation-in-part of patent application Ser. No. 800,193, filed May 25, 1977, abandoned.

BACKGROUND OF THE INVENTION

This invention is in the field of photoflash lamp units, such as multiple flash arrays having flash lamps enclosed in a housing provided with a transparent front cover through which light passes from a lamp when flashed.

Various reflector designs have been devised to direct the light from a flashing lamp toward the scene being photographed, so as to utilize the light more effectively than would be the case with a bare lamp emitting its light in all directions. Concave reflectors are customarily positioned behind the flash lamps so as to reflect and concentrate the light of the flashing lamp toward the scene being photographed. For example, U.S. Pat. No. 3,609,332 to Donald R. Schindler discloses a flash lamp unit having elongated concave quasi-cylindrical reflectors positioned behind and axially aligned with elongated tubular flash lamps. These reflectors, the side portions of which extend laterally sideways of and flank the lamps, have a parabolic curvature so as to effectively reflect a maximum of light from a flashing lamp in a frontward direction to illuminate the scene being photographed. U.S. Pat. No. 3,993,896 to Alfred Wacker discloses a flash lamp unit having elongated concave quasi-cylindrical reflectors of which the side portions which extend laterally sideways of and flank the lamps are flat instead of having parabolic curvatures as in the Schindler patent, and therefore reflect light more laterally than required to illuminate the scene to be photographed, whereby some of the light would be wasted. To usefully recover some of this reflected light that would be wasted, the transparent front cover is provided with groups of prisms in front of the side portions of the reflectors, which prisms direct the reflected light more frontwardly toward the scene to be photographed. German Pat. No. V6678 discloses a somewhat similar reflector-prism arrangement, in combination with a gas discharge tube. U.S. Pat. No. 3,878,385 to Kingston discloses a flash cover provided with concentric circular prisms for concentrating light when the lamp is flashed.

SUMMARY OF THE INVENTION

The primary object of the invention is to provide an improved photoflash unit having improved illumination efficiency and which projects increased illumination onto a scene being photographed.

At least three distinct classes of photoflash reflector units have been identified: (1) a specular reflector having a contour which efficiently directs light from the flashlamp which is incident upon it into the desired photographic field (the above-referenced Schindler patent describes such a reflector); (2) a specular reflector having a contour which does not of itself efficiently direct light from the flashlamp which is incident upon it into the desired photographic field (the above-referenced Wacker patent describes such a reflector); and (3) a diffusing reflector which scatters light from the flashlamp which is incident upon it in a multitude of directions having a quasi-Lambertian distribution only part of which fall into the desired photographic field (U.S. Pat. No. 3,858,038 to Buzalski describes such a reflector).

In all of these three classes, in addition to the light from the lamp which is incident upon and redirected by the reflector, there is a quantity of light from the lamp which is radiated in such directions that it is not intercepted by the reflector. Of this light, part is directed into the desired photographic field and another part (usually larger than the first in the case of compact photoflash systems) is directed outside of the photographic field. It is this latter part, which has (so far as we are aware) never received specific separate attention, which is the concern of this invention.

The function of the invention is to refractively redirect specifically at least part of that portion of light which is emitted from the lamp, which does not strike the reflector, and which is not directed into the desired photographic field, more into that field, while carefully avoiding interference with the already correctly directed light, either reflected or not reflected, to an extent which would result in a net loss of light in the photographic field.

In the case of the first class of reflectors described above, where the light from the reflector is well directed in the plane perpendicular to the lamp axis, the present invention provides refractive elements parallel to the axis of the lamp, placed so as to intercept the diverging light from the lamp having a directional component in this plane, without intercepting an appreciable amount of light from the reflector. In the direction longitudinal to an elongated lamp and an elongated reflector the greater part of the reflected light has approximately the same directional distribution as the direct light from the lamp, so that refractive elements perpendicular to the elongated dimension of the reflector may extend both in front of the lamp and in front of the reflector so as to redirect the diverging light without having a deleterious effect on the reflected light. An improvement of 12% of the light in the desired photographic field has been measured for such a configuration.

In the case of the second class of reflectors, the prisms described in the above-referenced Wacker patent, for example, provide correction to the reflected light and are, therefore, placed only in front of the inefficient side portions of the reflector; the present invention, as described in the preceding paragraph, could be advantageously combined with his invention, supplementing it to provide additional illumination of the photographic field without interfering in any way with his invention.

In the case of the third class of reflectors, since the reflected light is approximately Lambertian, the present invention provides refractive elements over the whole face of the reflector so as to redirect the diverging light from the lamp; those refractive elements will also deflect some of the correctly directed light from the reflector so that it falls outside the photographic field, but at the same time they will redirect some of the misdirected light, of about equal intensity, from other parts of the reflector so that it falls into the field, so that the net effect of the refractive elements on the reflected light is not appreciable. An improvement of more than 25% of the light in the photographic field has been measured for such a configuration.

The invention comprises, briefly and in a preferred embodiment, a photoflash unit having one or more elongated flash lamps, and a light-transmissive cover in front of the flash lamps which is provided with a group of one or more elongated light-refractive elements or prism means at a region directly in front of each flash lamp and parallel to the lamp axis so as to refract some of the light from the lamp when flashed in a more frontward direction. Preferably, an additional group of elongated prism means is provided in front of and perpendicular to the axis of each lamp, to further increase the useful frontwardly directed light from the unit, and may be incorporated in a cover of the array. One group of prisms can be on one surface (for example, the front) of the cover and the other group of prisms can be on the other surface (for example, the rear) of the cover. The two groups of refractive elements may be combined at a single surface, in the form of sections or facets having oblique angles so as to provide a refractive system which is the optical equivalent of discrete horizontal and vertical prisms. In a flash unit having an elongated flash lamp axially aligned in combination with an elongated quasi-cylindrical reflector, the prisms of the cover perpendicular to the axes of the lamp and reflector may additionally function to refract frontwardly light that is divergently reflected by the reflector with longitudinal components in planes parallel to said axes. If the reflector surface is non-specular (such as white plastic) so as to scatter the reflected light rays, additional elongated prisms are provided on the cover, parallel to the lamp axis and in front of the reflector wings which flank the lamp, so as to converge the scattered reflected light.

BRIEF DESCRIPTION OF THE DRAWING

FIG. 1 is a perspective view of a multiple flash lamp array in accordance with a preferred embodiment of the invention.

FIG. 2 is a partial sectional view of FIG. 1 taken on the line 2—2 thereof.

FIG. 3 is a partial sectional view of FIG. 1 taken on the line 3—3 thereof.

FIG. 4 is an exploded view of the array of FIG. 1 showing the internal parts.

DESCRIPTION OF THE PREFERRED EMBODIMENT

A multiple flash lamp unit 17 of the FlipFlash planar array type and containing a plurality of electrically fired flash lamps is provided with a plug-in connector tab 18 at the lower side or end thereof, adapted to fit into a socket of a camera or flash adapter. The lamp array 17 is provided with a second plug-in connector tab 18' at the top side or end thereof, whereby the array 17 is adapted to be attached to the camera socket in either of two orientations, ie., with either the tab 18 or the tab 18' plugged into the socket. The array 17 is provided with an upper group 21 of flash lamps 22, 23, 24, and 25, and a lower group 26 of flash lamps 27, 28, 29, and 30, the lamps being arranged in a planar configuration. Reflectors 22', etc., are disposed behind and laterally sideways of the respective flash lamps, so that as each lamp is flashed, its light is projected forwardly of the array 17. The lamps are arranged and connected so that when the array is connected to a camera by the connector 18, only the upper group 21 of lamps will be flashed, and when the array is turned end for end and connected to the camera by the other connector 18', only the then upper group 26 of lamps will be flashed. By this arrangement, only lamps relatively far from the lens axis are flashable, thus reducing the undesirable red-eye effect.

The construction of the array comprises front and back housing members 36 and 37, which preferably are made of plastic and are provided with interlocking members 38 which can be molded integrally with the housing members and which lock the housing members together in final assembly to form a unitary flash array structure. In the preferred embodiment shown, the front housing member 36 is a rectangular concavity and the back housing member 37 is substantially flat and includes integral extensions 39 and 39' at the ends thereof which partly surround and protect the connector tabs 18 and 18' and also function to facilitate mechanical attachment to the camera socket. Sandwiched between the front and back housing members 36 and 37, in the order named, are the flash lamps 22, etc., a unitary reflector member 41 (such as aluminum-coated plastic for a specular reflector or white plastic for a non-specular reflector) shaped to provide the individual reflectors 22', etc., a printed circuit board 42 provided with integral connector tabs 18 and 18', and an indicia sheet 43 which may be provided with instructions and other indicia such as flash indicators located behind the respective lamps and which change color or appearance due to heat and/or light radiation from a flashing lamp, thus indicating at a glance which of the lamps have been flashed and not flashed.

The indicia sheet 43 may be of paper or thin cardboard and provided with openings where the flash indicators are desired, the openings being covered with flash indicator material 48, such as a sheet-like heat-sensitive plastic material, for example biaxially oriented polypropylene, which shrinks or melts when subjected to heat or radiant energy fron an adjacent flashing lamp thus effectively changing the color of the openings in the indicia sheet 43. Openings 51 are provided through the reflector unit 41 and the circuit board 42 to facilitate radiation from flashing lamps reaching the flash indicator sheet 48. The rear housing member 37 is transparent (either of clear material or provided with window openings) to permit viewing of the indicia on the indicia sheet 43. The front housing member 36 is transparent at least in front of the lamps 22, etc., to permit light from flashing lamps to emerge frontwardly of the array, and may be tinted to alter the color of light from the flash lamps.

The height and width of the rectangular array are substantially greater than its thickness, and the heights and widths of the reflector member 41 and circuit board 42 are substantially the same as the interior height and width of the housing member 36, to facilitate holding the parts in place.

The tab 18, which is integral with the circuit board 42, is provided with a pair of electrical terminals 31 and 32, and similarly the tab 18' is provided with a pair of terminals 31' and 32', for contacting terminals of a camera socket for applying firing voltage pulses to the array. Each tab is provided with a third terminal 33 and 33', respectively, which functions to electrically short the circuitry of the inactive lower group of lamps, when the array is plugged into a socket. The terminals 31 and 31' are shown as having a lateral "T-bar" configuration for temporarily shorting the socket terminals while the array is being plugged in, to discharge any residual voltage charge in the firing pulse source and also to reduce the likelihood of lamps being accidentally flashed by electrostatic voltage when the array is handled.

The circuit board 42 has a "printed circuit" thereon, as will be described, for causing sequential flashing of the lamps by firing voltage pulses applied to the terminals 31, 32 or 31', 32'. The top and bottom halves of the printed circuitry preferably are reverse mirror images of each other. The lead wires 22a, 22b, etc., of the lamps 22, etc., may be attached to the circuit board 42 in various ways, such as by means of metal eyelets 22a', 22b', etc., placed through openings in the board. The lead wires 22a, 22b, etc., pass through openings 52 in the reflector member 41 and into or through the respective pairs of eyelets 22a', 22b', etc., and the ends of the eyelets are crimped or bent to hold the lead wires and make electrical contact thereto and also to hold the eyelets in place with their heads in electrical contact with the circuit of the circuit board.

A metal clip 56 is clipped onto the reflector member 41, which reflector preferably is made of metal-coated plastic, and the rear of the clip 56 rests in touching contact against an area 57 of an electrical ground circuit run 58 on the board and which includes the terminals 31 and 31' and which makes contact with one of the connector eyelets 22a' or 22b', etc., for each of the lamps 22, etc., whereby the reflector unit 41 additionally functions as an electrically grounded shield, in the particular embodiment described.

Areas 59 on the transparent front housing member 36 may be made opaque or partly opaque, such as by making the surface roughened at these areas, to fully or partly conceal the lamp lead-in wires 22a, 22b, etc., and/or the lower portions of the lamps, for improved appearance of the array.

The circuit board terminal 32 is part of a conductor run that is electrically connected to lead-in wires 24a of lamp 24 at the eyelet 24a' and terminates at radiation switches 61, 62, and 63 respectively positioned near lamps 24, 25, and 23. A circuit board conductor run 64 is connected electrically to the remaining lead wire of flash lamp 25 at eyelet 25a' and terminates at the radiation switch 61. A circuit board conductor run 65 is connected to the remaining lead-in wire of flash lamp 23 at eyelet 23a' and terminates at the radiation switch 62. Similarly, a circuit board conductor run 66 is connected to the remaining lead-in wire of flash lamp 22 at eyelet 22b' and terminates at radiation switch 63.

The radiation switches 61, 62, and 63 are respectively in contact with the bridge across the circuit runs that are connected to them. The material for the radiation switches may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches is respectively positioned behind and near to a flash lamp 24, 25, 23. Windows in the form of transparent sections or openings 69 may be provided in the reflectors in front of the switches as shown in FIG. 4 to facilitate radiation transfer. A suitable material for the radiation switches is silver oxide or carbonate dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into a socket, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable redeye effect. Further details of the above-described construction are disclosed in U.S. Pat. No. 3,935,442 to James Hanson.

The circuit on the circuit board 42 functions as follows. Assuming that none of the four lamps in the upper half of the unit 17 have been flashed, upon occurrence of a first firing pulse applied across the terminals 31, 32, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 61 to become a closed circuit (or a low value of resistance), thereby connecting the circuit board terminal 32 electrically to the lead-in wire of the second lamp 25 at eyelet 25a'. By the time this occurs, the firing pulse has diminished to a value insufficient to cause the second lamp 25 to flash. When the next firing pulse occurs, it is applied to the lead-in wires of the second lamp 25, via the now closed radiation switch 61, whereupon the second lamp 25 flashes, thereby causing radiation switch 62 to assume zero or low resistance, and the second lamp 25 now has an open circuit or high resistance between its lead-in wires. When the next firing pulse occurs, it is applied via now closed radiation switch 62 to the third lamp 23, thereby firing the lamp which becomes an open circuit, and the radiation from it causes the radiation switch 63 to become essentially a closed circuit across its terminals. Thus, the next firing pulse will be applied, via now closed radiation switch 63, to the lead-in wires of the fourth flash lamp 22, thereupon causing the lamp to flash. Since this lamp is the last lamp in the active circuit, it does not matter whether its lead-in wires are an open or closed circuit after flashing. Additional flash lamps, radiation switches, and electrical conductors can be employed, if desired, using the just described principles. When the flash unit is turned around the other conductor tab 18' attaches to the camera socket, the group of lamps that then become uppermost and relatively farthest away from the lens axis will be in an active circuit and will be flashed in the same manner as has been described. In a preferred embodiment, the lamps 22, etc., are high voltage types, requiring about 1000 volts for example, at low current, for flashing, and this voltage can be provided by impacting or stressing a piezoelectric element in the camera.

The flash lamps 22–25 and 27–30 have the well-known elongated cylindrical configuration as best shown in FIG. 4, and the individual reflectors 22'–25' and 27'–30' are in the form of elongated concave quasi-cylinders having parabolic curvatures as viewed in FIG. 3, and are further described in the above-referenced Schindler patent. These reflectors are specular, ie. each single ray of light reaching the reflector is reflected as a single ray of light, as contrasted with a non-specular reflector (to be described) which scatters the reflected light. The specular reflectors reflect the light from the different points in a flashing lamp substantially frontwardly of the array and in a horizontally divergent pattern as indicated by a bundle 71 of light-ray lines (FIG. 3) emanating from various points within the flash lamp 30 and being reflected by a side portion 72 of the reflector 30' into a divergent pattern. The sum of all such divergent light patterns, reflected by the area of the reflector from the flash lamp, is a horizontally divergent flash of reflected light which substantially fills and illuminates a scene being photographed. Stated another way, the angle of divergence horizontally of the light reflected frontwardly by the reflector is about the same as that of the picture-viewing angle of a typical camera lens, ie., about 40°. The words "horizontal" and "vertical" as used herein regarding the shape and/or directional spread of light from a flashing lamp are relative terms and are interchangeable if the array is turned 90°. In the embodiment shown and described, the axes of the elongated flash lamps and reflectors are vertical as is their usual orientation when pictures are taken using presently available FlipFlash arrays. A vertical spread or divergence of light reflected by each reflector is caused in part by the elongated configurations of the flash lamps and their reflectors. Since the light radiated from every point in the flashbulb emanates in the form of a widely divergent beam, substantially in all directions of a sphere having its center at the point in the flash lamp under consideration, light rays from that point which are in a horizontal plane will be reflected by the reflector horizontally ahead; and the light rays having a sufficient vertical component (up or down) will be reflected by the reflector frontwardly and with a vertical component (up or down), such as the light ray 73 (FIG. 2) originating from a point 74 of the flash lamp 23 and reflected at a point 74' on the surface of the reflector 23', will be reflected outside of the scene being photographed.

Light emanating from the array directly from a flash lamp (and not reflected by the reflector) is divergent over an angle considerably greater than required for covering the scene to be photographed, and therefore the portion of this light falling outside the boundaries of the scene being photographed is wasted.

In accordance with the invention, one or more elongated light-refractive prism means are provided directly in front of and parallel to the axis of each flash lamp so as to refract some of the light therefrom when flashed in a more frontward direction, thus increasing the efficiency and useful light output of the array. These prism means may be bevel-shaped prisms at either or both of the front and rear surfaces of the front wall of the front cover 36. For example, a pair of elongated prisms 75 and 76, shown most clearly in FIGS. 2 and 3, extend vertically in front of one column of vertically oriented lamps 23, 25, 28, and 30, and another similar pair of prisms 75' and 76' extend vertically in front of the other column of vertically oriented lamps 22, 24, 27, and 29. Thus, the prisms are parallel to the lamp axes. These pairs of prisms preferably are molded on the rear surface 77 of the front part of the cover 36, and have rearwardly extending spaced apart steps or edges 75a and 76a which are symmetrical with respect to the lamp axes, the working surfaces 75b and 76b (which may be flat or curved, as desired) of these prisms being beveled so as to taper mutually outwardly and to the rear surface 77 of the cover. The prism steps 75a and 76a can be made shallower, or nonexistent, by filling some or all of the space between them with the molded cover material. The portions 77a and 77a' of the rear of the front cover respectively between the prism inside edges 75a, 76a and 75a', 76a' are shown flat so as to permit light transmission in normal manner from the central sector of the flashing lamp. In certain arrays, such as those containing large diameter lamps, it may be advantageous to provide one or more additional elongated prisms in these portions 77a and 77a'. The prisms 75 and 76 can extend continuously the entire height of the array, or can be discontinuous at intervals 78 where not needed, as shown in FIG. 2. As shown in FIG. 3, an exemplary light ray 81 emanating from the flashing lamp 29 and which is in a direction sufficiently sideways so as to fall outside of the area of the scene being photographed is refracted somewhat frontwardly by the prism 75', as indicated at 81', so as to contribute to the useful illumination of the scene. Similarly, another exemplary light ray 82 emanating from the lamp sufficiently sideways in the opposite direction so as to fall outside of the area of the scene being photographed is refracted somewhat frontwardly by the prism 76', as indicated at 82', so as to contribute to the useful illumination of the scene. Although only two exemplary refracted light rays 81' and 82' are shown, there are virtually an infinite number of individual light rays emanating from areas of the flash lamp and which are refracted somewhat frontwardly by the prisms 75' and 76' (and also 75 and 76) in front of each lamp, with differing degrees of forward vector component (ie., light rays emanating from different points of the lamp will have differing refracted frontward directions, similar to the reflected bundle 71 of light rays) so that light directly from the lamp which would otherwise fall uselessly outside the picture area is refracted into the picture area with fairly good brightness uniformity over the area. Many of these refracted light rays will have vertical components of direction (up or down), further contributing to uniformity of brightness of the refracted light over the picture scene area. The foregoing improvements apply mainly to light emanating from the front portion of the lamp. A plurality of parallel prisms can be substituted for the individual prisms 75, 76, etc., in a Fresnel manner. Adding further prisms outwardly from those shown, and in front of the reflector sides 72, would not contribute significantly to the desired effect just described, and would be detrimental to the desirable pattern of reflected light that is achieved by the parabolic reflectors. However, if the reflectors are not parabolic, or are nonspecular, it may be desirable to provide vertical prisms in front of the reflector sides to improve the distribution of light. For example, if the reflector 29' (FIG. 3) has a nonspecular surface such as white plastic which causes the light rays to become scattered when reflected, it is desirable to provide additional elongated prisms 85 on the cover 36, similarly shaped and parallel to the prisms 75' and 76' and lying in front of the reflector wing portions that reflect light of the lamp 29 when flashed, so as to converge some of the scattered reflected light into the picture scene area and increase brightness. Optimum size and shape of the prisms can be determined experimentally and by optical design principles. The essence of the invention is that at least a portion of the prisms 75 and 76, etc., be directly in front of, and preferably close to, the respective lamps, as best shown in FIG. 3.

Preferably one or more prisms are provided in front of each lamp in a horizontal orientation and crosswise with respect to the vertical prisms 75, 76, etc. Groups 86 and 87 of horizontal and mutually parallel Fresnel-arranged prisms can be molded in a surface of the plastic cover 36, preferably at the front or opposite surface from where the vertical prisms 75, 76, etc., are provided. The horizontal prisms of the group 87 are positioned in front of the lower side region of each elongated flash lamp 23, etc., and are shaped to refract light rays somewhat upwardly (the array being assumed to be in its normal intended position for use, as shown in the drawing). For example, a light ray 88 emanating directly from a point 89 in the lamp 23 when flashed and having a sufficient downward vector component so that it would fall outside of the picture scene area as covered by the camera lens, is refracted more frontwardly, as indicated at 88', by one of the prisms of the group 87 so as to usefully fall in the picture area. Many light rays, such as rays 91, 92, and 93 which emanate from the flashing lamp and which would illuminate the picture area, will be refracted as indicated at 91', 92', and 93' and will still usefully illuminate the picture area. The other group 86 of prisms, positioned in front of the upper side region of the lamp, functions similarly, by refracting some of the light from the flash lamps, having upward components, somewhat downwardly and hence more frontwardly and onto the picture area.

Preferably, the groups 86 and 87 of horizontal prisms extend entirely across the widths of the reflectors 22', etc., and additionally perform a useful function of refracting somewhat frontwardly some of the reflected light from a flashing lamp having a sufficient vertical vector component so that after reflection by the reflector 23', etc., it would fall outside of the area of the scene being photographed. For example, the reflected light ray 73 (FIG. 2), described above as having a sufficient vertical vector component so as to fall uselessly outside of the picture area as seen by the camera lens, is refracted somewhat frontwardly by the group 86 of prisms, as indicated at 73', so as to contribute to the illumination of the picture area. Other light rays which would illuminate the picture area are refracted toward different parts of the picture area, and some light rays that would illuminate the picture area are refracted outside the picture area. It has been found that the amount of light refracted into the picture area by the horizontal groups 86, 87 of prisms is considerably greater than the amount of light refracted out of the picture area by these prisms. This is believed to be due to the elongated shapes of the lamps and reflectors, and the placements of the groups 86 and 87 of prisms across the upper and lower portions of each lamp and reflector, so that a greater amount of light from the central lengthwise region of a lamp is usefully refracted into the picture area than the amount of light from near the ends of a lamp that becomes refracted out of the picture area.

The above-described crisscross arrangement of prisms, applied to a regular FlipFlash array, provides an increase of about 12% in total zonal lumen seconds of illumination directed from a flashing lamp onto the picture scene area as is "seen" by a normal camera lens having a 40° angle of view, the flash array being attached to the camera in the normal way. About half of this gain is contributed by the vertical groups of prisms 75, 76, etc., and the other half by the horizontal groups 86, 87 of prisms. Preferably, the crisscross groups of prisms are molded into the front cover 36 of the array, as shown, and preferably the vertical groups 75, 76 and 75', 76' of prisms are at the rear surface, and the horizontal groups 86, 87 of prisms are at the front surface, of the front cover 36.

For simplicity in the drawing, the illustrative light rays 73, 93, 81', etc., passing through the front cover are shown as being refracted at only one surface, whereas in reality there will be some refraction at each surface as is the case of any light ray passing obliquely through boundaries of two different mediums, such as air and plastic, having different optical indices of refraction.

The principles of the invention can be applied to flash arrays in which the elongated lamps are horizontal when the array is in its normal intended position for flashing, in which event the above-used terms "vertical" and "horizontal", as applied to the lamps and prisms, would be interchanged.

The prism means can comprise various embodiments, such as elongated prisms as described above, or they can be segmented into individual aligned elements, or other refractive configurations. Thus, the term "prism means" is used herein in a broad sense so as to include various suitable refractive means and arrangements.

While preferred embodiments of the invention have been shown and described, various other embodiments and modifications thereof will become apparent to persons skilled in the art and will fall within the scope of the invention as defined in the following claims. The principles of the invention can be applied to flashcubes and other types of flash units.

What we claim as new and desire to secure by United States Letters Patent is:

1. A photoflash unit comprising an elongated flash lamp which when flashed emits light over a wider angle than the viewing angle of a normal camera lens, a reflector having reflective areas laterally flanking said lamp, and first two or more elongated prism means symmetrically positioned directly in front of said lamp and parallel to the axis thereof, and a second two or more elongated prism means symmetrically positioned directly in front of said lamp and perpendicular to the axis thereof, each of said first and second prism means being shaped for refracting and coverging light emanating directly from said lamp when flashed in a more frontward direction and into said viewing angle of the camera lens so as to increase the brightness substantially uniformly within said viewing angle.

2. A photoflash unit as claimed in claim 1, in which said first elongated prism means extends over substantially all of the light-producing height of said lamp.

3. A photoflash unit as claimed in claim 1, in which said second elongated prism means extends across the width of said lamp and across said reflective areas.

4. A photoflash unit as claimed in claim 1, in which said second elongated prism means comprises two groups of prisms extending respectively across the elongated end regions of said lamp.

5. A photoflash unit as claimed in claim 1, including a cover member positioned in front of said flash lamp, said first prism means being integral with one surface of said cover member and said second prism means being integral with the other surface of said cover member.

6. A photoflash unit as claimed in claim 5, in which said first prism means is at the rear surface of said cover member and said second prism means is at the front surface of said cover member.

7. A photoflash unit as claimed in claim 5, in which said second elongated prism means extends across said lamp and across said reflective areas.

8. A photoflash unit comprising an elongated flash lamp which when flashed emits light over a wider angle than the viewing angle of a normal camera lens, a reflector having spectral reflective areas laterally flanking said lamp and shaped to reflect light from said lamp when flashed in a desired pattern, and two or more elongated prism means symmetrically positioned directly in front of said lamp and parallel to the axis thereof, said prism means being shaped for refracting and converging light emanating directly from said lamp when flashed in a more frontward direction and into said viewing angle of the camera lens so as to increase the brightness substantially uniformly within said viewing angle, there being no prism means parallel to said lamp axis directly in front of said reflective areas of the reflector.

9. A photoflash unit as claimed in claim 8, in which said elongated prism means extends over substantially all of the light-producing height of said lamp.

10. A photoflash unit as claimed in claim 8, including a second one or more elongated prism means positioned directly in front of said lamp and perpendicular to the axis thereof, said second prism means being shaped for refracting light emanating directly from said lamp when flashed in a more frontward direction.

11. A photoflash unit as claimed in claim 10, in which said second elongated prism means extends across the width of said lamp and across said reflective areas.

12. A photoflash unit as claimed in claim 10, in which said second elongated prism means comprises two groups of prisms extending respectively across the elongated end regions of said lamp.

13. A photoflash unit as claimed in claim 10, including a cover member positioned in front of said flash lamp, the first of said prism means being integral with one surface of said cover member and said second prism means being integral with the other surface of said cover member.

14. A photoflash unit as claimed in claim 13, in which said first prism means is at the rear surface of said cover member and said second prism means is at the front surface of said cover member.

15. A photoflash unit comprising an elongated flash lamp which when flashed emits light over a wider angle than the viewing angle of a normal camera lens, a reflector having nonspectral reflective areas laterally flanking said lamp, and two or more elongated prism means symmetrically positioned directly in front of said lamp and parallel to the axis thereof, said prism means being shaped for refracting and converging light emanating directly from said lamp when flashing in a more frontward direction and into said viewing angle of the camera lens so as to increase the brightness substantially uniformly within said viewing angle.

16. A photoflash unit as claimed in claim 15, in which said elongated prism means extends over substantially all of the light-producing height of said lamp.

17. A photoflash unit as claimed in claim 15, including additional elongated prism means parallel to said axis of the lamp and positioned directly in front of said reflective areas.

18. A photoflash unit as claimed in claim 15, including a second one or more elongated prism means positioned directly in front of said lamp and perpendicular to the axis thereof, said second prism means being shaped for refracting light emanating directly from said lamp when flashed in a more frontward direction.

19. A photoflash unit as claimed in claim 18, in which said second elongated prism means extends across the width of said lamp and across said reflective areas.

20. A photoflash unit as claimed in claim 18, in which said second elongated prism means comprises two groups of prisms extending respectively across the elongated end regions of said lamp.

21. A photoflash unit as claimed in claim 18, including a cover member positioned in front of said flash lamp, the first of said prism means being integral with one surface of said cover member and said second prism means being integral with the other surface of said cover member.

22. A photoflash unit as claimed in claim 21, in which said first prism means is at the rear surface of said cover member and said second prism means is at the front surface of said cover member.

* * * * *

UNITED STATES PATENT AND TRADEMARK OFFICE
CERTIFICATE OF CORRECTION

PATENT NO. : 4,234,906
DATED : November 18, 1980
INVENTOR(S) : Donald R. Schindler and Thomas F. Soules It is certified that error appears in the above-identified patent and that said Letters Patent are hereby corrected as shown below:

[75] Inventors: Donald R. Schindler, Burton;
                            Thomas F. Soules, Cleveland
                              Heights, both of Ohio Signed and Sealed this Seventeenth Day of February 1981

[SEAL]

*Attest:*

RENE D. TEGTMEYER

*Attesting Officer*      *Acting Commissioner of Patents and Trademarks*